United States Patent
Kim et al.

(10) Patent No.: US 6,563,807 B1
(45) Date of Patent: May 13, 2003

(54) INTER-FREQUENCY HANDOFF EXECUTION METHOD AND APPARATUS IN MOBILE COMMUNICATION SYSTEM

(75) Inventors: Jong Heon Kim, Seoul (KR); Jong Youn Kim, Kyungki-do (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/212,573

(22) Filed: Dec. 16, 1998

(30) Foreign Application Priority Data

Dec. 30, 1997 (KR) ............................................. 97-79171

(51) Int. Cl.[7] .......................... H04Q 7/20; H04B 7/216
(52) U.S. Cl. ...................... 370/331; 370/310; 370/335; 370/342; 455/436; 455/444
(58) Field of Search ................................. 370/310, 320, 370/331, 335, 342, 343, 441, 479, 470; 455/436, 439, 442, 444

(56) References Cited

U.S. PATENT DOCUMENTS

| | | | |
|---|---|---|---|
| 5,649,000 A | | 7/1997 | Lee et al. .................... 455/436 |
| 5,859,840 A | * | 1/1999 | Tiedemann, Jr. et al. ... 370/335 |
| 5,896,368 A | * | 4/1999 | Dhalman et al. ............ 370/335 |
| 5,991,330 A | * | 11/1999 | Dahlman et al. ............ 375/200 |
| 5,999,816 A | * | 12/1999 | Tiedemann et al. ......... 455/437 |
| 6,069,880 A | * | 5/2000 | Owen et al. ................. 370/311 |
| 6,078,570 A | * | 6/2000 | Czaja et al. ................. 370/331 |
| 6,101,176 A | * | 8/2000 | Honkasalo et al. ......... 370/335 |
| 6,148,209 A | * | 11/2000 | Hamalainen et al. ....... 455/450 |
| 6,154,652 A | * | 11/2000 | Park et al. ................... 455/437 |
| 6,215,777 B1 | * | 4/2001 | Chen et al. .................. 370/335 |

* cited by examiner

Primary Examiner—Hassan Kizou
Assistant Examiner—Saba Tsegaye
(74) Attorney, Agent, or Firm—Fleshner & Kim, LLP (57) ABSTRACT

An inter-frequency handoff execution method in a mobile communication system according to the present invention includes the steps of: transmitting from a base station a data frame in which a data transmission section and a frequency search section exist to an arbitrary mobile terminal; executing data transmission in the data transmission section; searching a frequency of other base station in the frequency search section; and determining whether or not handoff is executed in accordance with the searched result.

52 Claims, 12 Drawing Sheets

FIG.1A
Prior Art

| a | b | . | . | . | . | . | . | . | . | . | . | . | . | . | p |
|---|---|---|---|---|---|---|---|---|---|---|---|---|---|---|---|
| 0 | 1 | 2 | 3 | 4 | 5 | 6 | 7 | 8 | 9 | 10| 11| 12| 13| 14| 15|

| a | b | . | . | . | . | . | h | a | b | . | . | . | . | . | h |
|---|---|---|---|---|---|---|---|---|---|---|---|---|---|---|---|
| 0 | 1 | 2 | 3 | 4 | 5 | 6 | 7 | 8 | 9 | 10| 11| 12| 13| 14| 15|

INTER-FREQUENCY HANDOFF EXECUTION METHOD AND APPARATUS IN MOBILE COMMUNICATION SYSTEM

BACKGROUND OF THE INVENTION

1. Field of the Invention

The present invention relates to an inter-frequency handoff execution method and apparatus in a mobile communication system, and more particularly, to an inter-frequency handoff execution method and apparatus in a code division multiple access(hereinafter, referred to as "CDMA") cellular telephone system which transmits/receives data between a mobile terminal having a single radio frequency(RF) receiver and a base station and at the same time, searches the frequency supplied in other base station to thereby determine whether or not handoff is executed.

2. Discussion of Related Art

In configuration, generally, a cellular telephone system is comprised of a plurality of cells which are made by dividing the whole service area into a plurality of small areas in consideration of topographical characteristics and propagation environments, a base station which is placed in a preset service area and has a function of interfacing a mobile terminal to a mobile station, and a base station controller (BSC) which controls the base station disposed in the preset service area.

Under the above configuration of the cellular telephone system, if a user of the mobile terminal is in conversation with a called or calling party during movement, the service area of the current cell is moved to that of another cell. At the time, when the user of the mobile terminal is adjacent to inter-cell boundary location, the mobile terminal executes handoff to maintain a good conversation quality. That is, when the strength of the signal transmitted from the current base station is weak, the mobile terminal changes its communication link to an adjacent base station which can provide a good quality of signal, without dropping call. For this end, the mobile terminal determines a signal quality of the adjacent other base station, during conversation and provides the determined result to its base station. At this time, the base station receives the determined result from the mobile terminal and if it is determined that the handoff is necessary, transmits a handoff request signal to the mobile station. This procedure is called "a mobile terminal-assisted handoff".

In the handoff execution process, it is important that the mobile terminal accurately receives the signal from the adjacent other base station and provides the received signal to a corresponding base station. For this end, a mobile terminal in the conventional CDMA cellular telephone system includes an RF receiver for demodulating data transmitted from the base station and an additional digital receiver as a searcher for searching different frequencies existing within the same channel. Therefore, the mobile terminal can measure the strength of signal provided from other base station, during conversation, by using the additional searcher.

In a real cellular telephone system, if the service area of one cell is small, the capacity of the mobile terminal within the corresponding service area can be increased. Under the above condition, however, in the case where the user of the mobile terminal is moved at a high speed by using transportation means such as vehicles, the base station and the mobile station are likely to fail in processing the call generated by the handoff.

To facilitate a successful handoff process within the mobile terminal which is moved at a fast speed, firstly, the whole cell area is divided into a plurality of micro-cells, and secondly, above the micro-cells a plurality of macro-cells are disposed, each of which has a larger service area than the micro-cell. Such the division of cells forms a hierarchical cell structure or a layered cell structure. Under the above cell structure, in the case where an arbitrary mobile terminal moves within the micro-cell or to an adjacent macro-cell deviated from the micro-cell, the handoff should be implemented all in the movement within the micro-cell or to the adjacent macro-cell.

In the hierarchical cell structure as mentioned above, since the strength of signal of the base station within the macro-cell is relatively great larger than that within the micro-cell, it is difficult to at the same time use the frequencies of the macro-cell and the micro-cell in the CDMA cellular telephone system. To build the hierarchical cell structure in the CDMA cellular telephone system, inter-frequency handoff between base stations should be executed.

The conventional mobile terminal includes an additional RF receiver for controlling the inter-frequency handoff. In the case where the mobile terminal is comprised of two or more RF receivers, however, light and tiny mobile terminal can not be produced. It is therefore known that the installation of two or more RF receiver in the mobile terminal is impossible, because it may decrease competitiveness of the mobile terminal.

As widely used, there is presented the technology that the mobile terminal including a single RF receiver transmits/receives data to/from the base station and at the same time senses the frequency of other base station to thereby implement the handoff. In other words, in case of transmitting a data frame from the base station to the mobile terminal, the data frame is broken to search the frequency of other base station. In this case, however, there occur problems that a quality of sound information supplied from the base station may be deteriorated and because of the damage of the data frame, control data necessary during conversation can be accordingly damaged. This results in the generation of call drop phenomenon between the mobile terminal and the base station.

SUMMARY OF THE INVENTION

Accordingly, the present invention is directed to an inter-frequency handoff execution method and apparatus in a mobile communication system that substantially obviates one or more of the problems due to limitations and disadvantages of the related art.

An object of the invention is to provide an inter-frequency handoff execution method and apparatus in a mobile communication system which inserts a frequency search section into a data frame used as data transmission section during a mobile terminal is in communication with a corresponding base station, executing data transmission in the data transmission section, searching a frequency of other base station in the frequency search section, and executing handoff at a rapid speed without generation of call drop, if execution of the handoff is requested.

According to an aspect of the present invention, an inter-frequency handoff execution method includes the steps of: transmitting from a base station a data frame in which a data transmission section and a frequency search section exist to an arbitrary mobile terminal; executing data transmission in the data transmission section; searching a frequency of other base station in the frequency search section; and determining whether or not handoff is executed in accordance with the searched result.

According to another aspect of the present invention, an inter-frequency handoff execution method includes the steps of: transmitting from an arbitrary mobile terminal a data frame in which a data transmission section and a frequency search section exist to a corresponding base station; executing data transmission in the data transmission section; and transmitting a reverse link pilot signal and a preamble signal in the frequency search section.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF PREFERRED EMBODIMENT

Reference will now be made in detail to the preferred embodiments of the present invention, examples of which are illustrated in the accompanying drawings.

Hereinafter, an explanation of an inter-frequency handoff execution method and apparatus in a CDMA cellular telephone system according to the present invention will be in detail discussed.

FIGS. 1A to 1D are timing diagrams illustrating signal transmission in a forward link from a transmitter of a base station to a mobile station in a prior art variable rate CDMA system, and FIGS. 2A to 2D are timing diagrams illustrating signal transmission in a reverse link from the mobile terminal to the base station in the prior art variable rate CDMA system, wherein FIGS. 1A to 1D are applied in a transmission energy variable system and FIGS. 2A to 2D in a transmission time variable system.

Figure 1A:
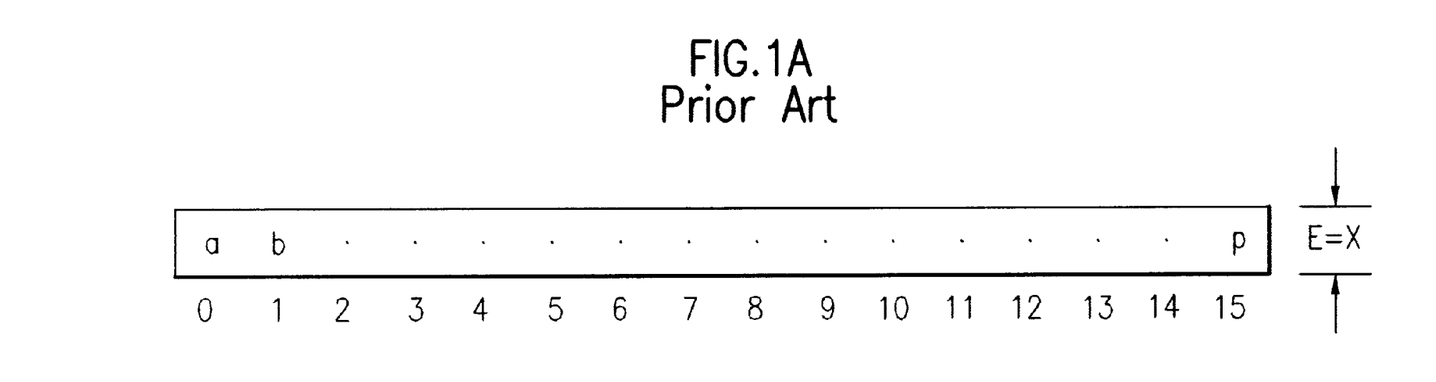
FIGS. 1A to 1D are timing diagrams illustrating signal transmission in a forward link of a prior art variable rate CDMA system.
Figure 1B:
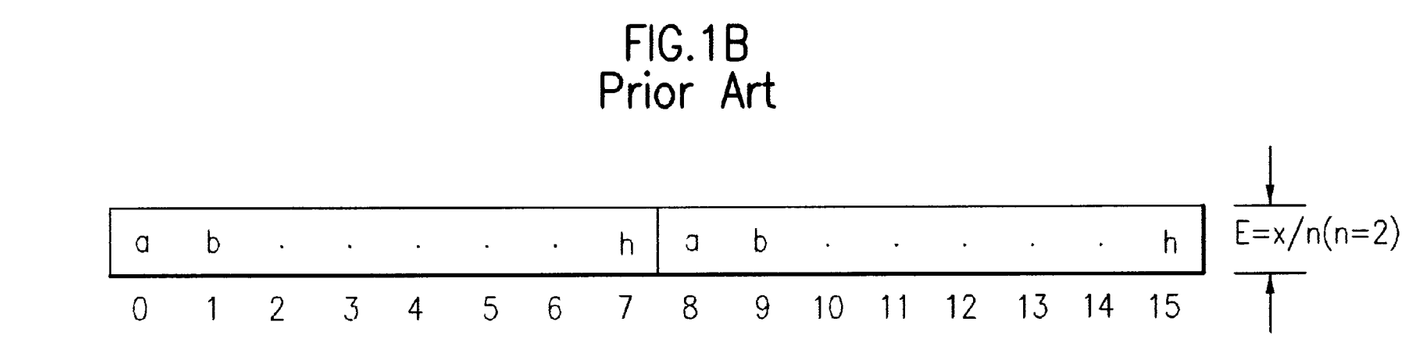
Figure 1C:
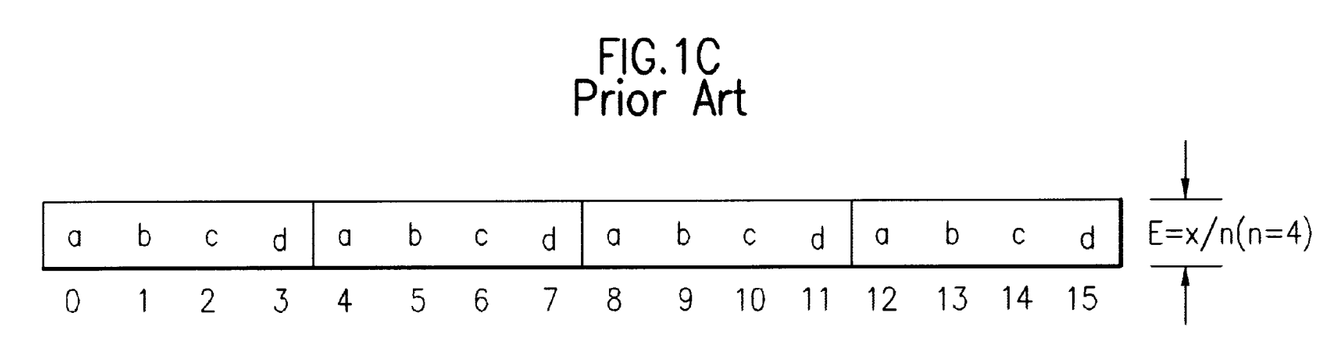
Figure 1D:
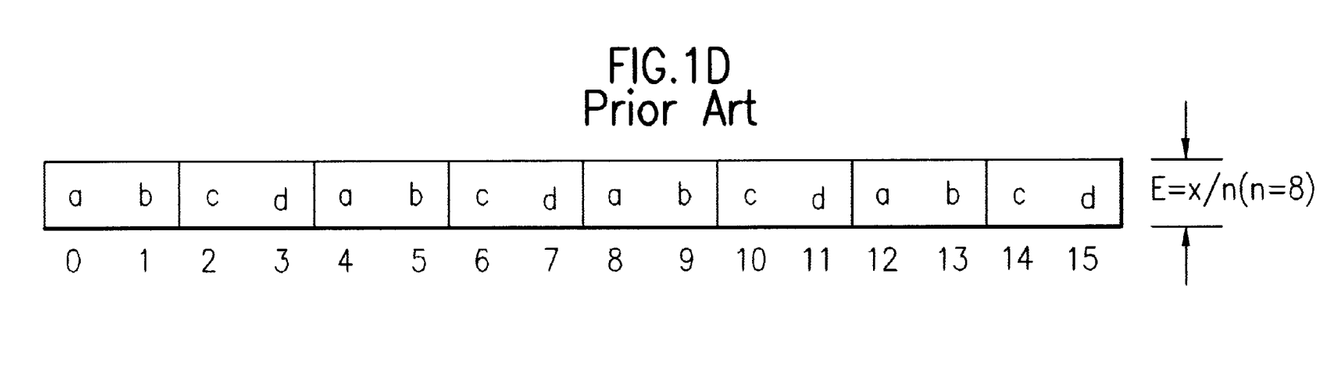
Figure 2A:
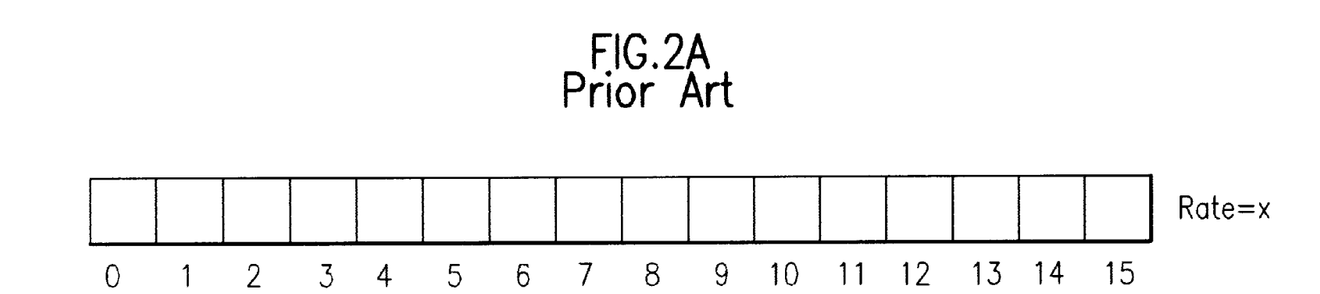
FIGS. 2A to 2D are timing diagrams illustrating signal transmission in a reverse link of a prior art variable rate CDMA system.
Figure 2B:
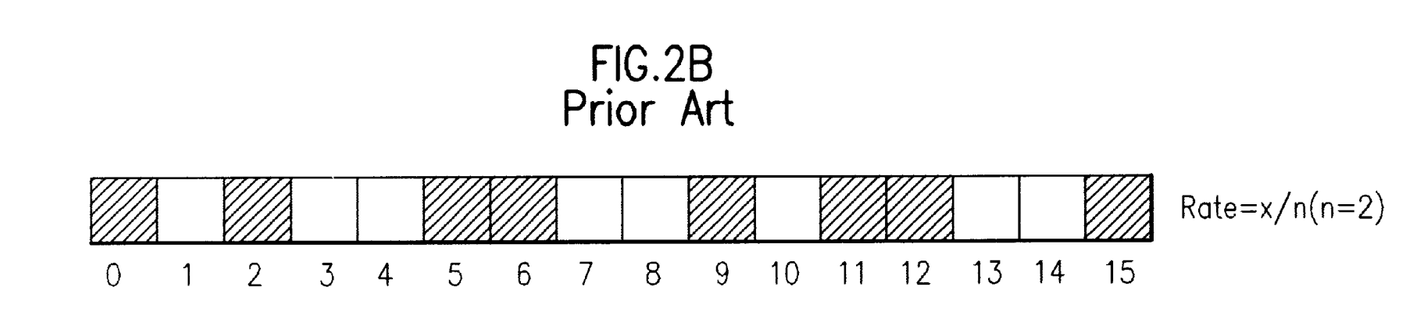
Figure 2C:
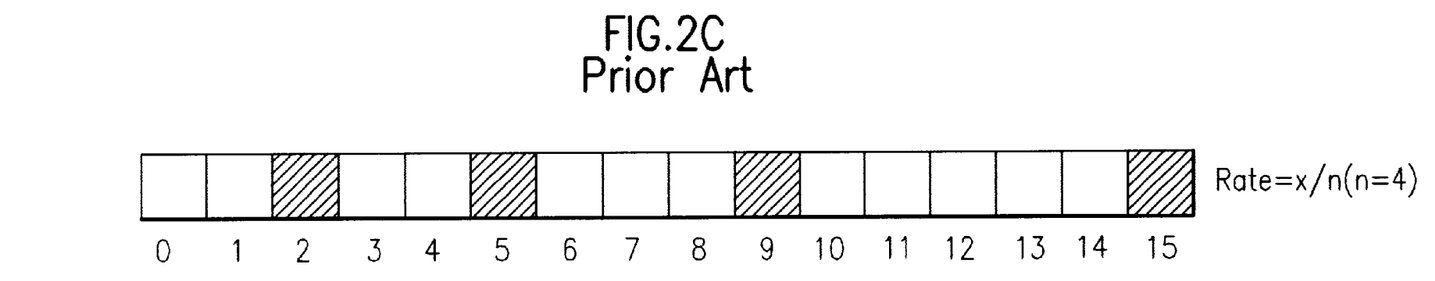
Figure 2D:
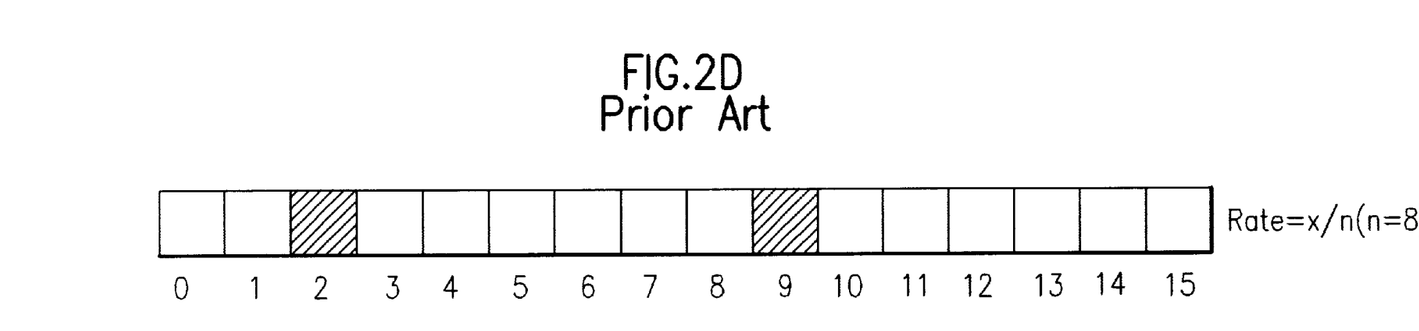

Referring first to FIGS. 1A to 1D, the sound frame transmitted from the base station is divided into 16 subframes, and the transmitted sound information is then transmitted to the mobile terminal through a full rate step (FIG. 1A), a half rate step (FIG. 1B), a quarter rate step (FIG. 1C), and an eighth rate step (FIG. 1D).

In this case, if the variable rate is reduced to 'n' (where n=2, 4 and 8), the number of bits per a data frame is decreased to 'n', so that the data frame can be repeatedly transmitted n times, as the power consumption of transmission signal is reduced to 1/n.

As noted, if the signal from the transmitting end is repeatedly transmitted, the repeatedly transmitted signals are combined and processed in a receiving end, so that time diversity effect can be obtained. In more detail, since the same signals are divided and transmitted at a predetermined time interval, even if a part of the repeatedly transmitted signals is broken, the transmitted signal can be somewhat demodulated by the remaining other signals.

To optimize the effect of time diversity, after all of the signal having 1/n frame length are transmitted to send the transmission signal at a maximum remote distance, the above transmission procedure is repeatedly processed.

Next, referring to FIGS. 2A to 2D, the transmission frame of sound information transmitted from the base station is sent in the state where transmission/reception sections are dispersed in a random pattern. For example, all frames are transmitted in FIG. 2A, one of 2 subframes is transmitted at ½ rate of FIG. 2B, one of 4 subframes is transmitted at ¼ rate of FIG. 2C, and one of 8 subframes is transmitted at ⅛ rate of FIG. 2D, in the random pattern, to the receiving part of the mobile terminal, respectively.

A transmission energy variable system, as shown in FIGS. 1A to 1D, is applied in a preferred embodiment of the present invention.

Figure 3:
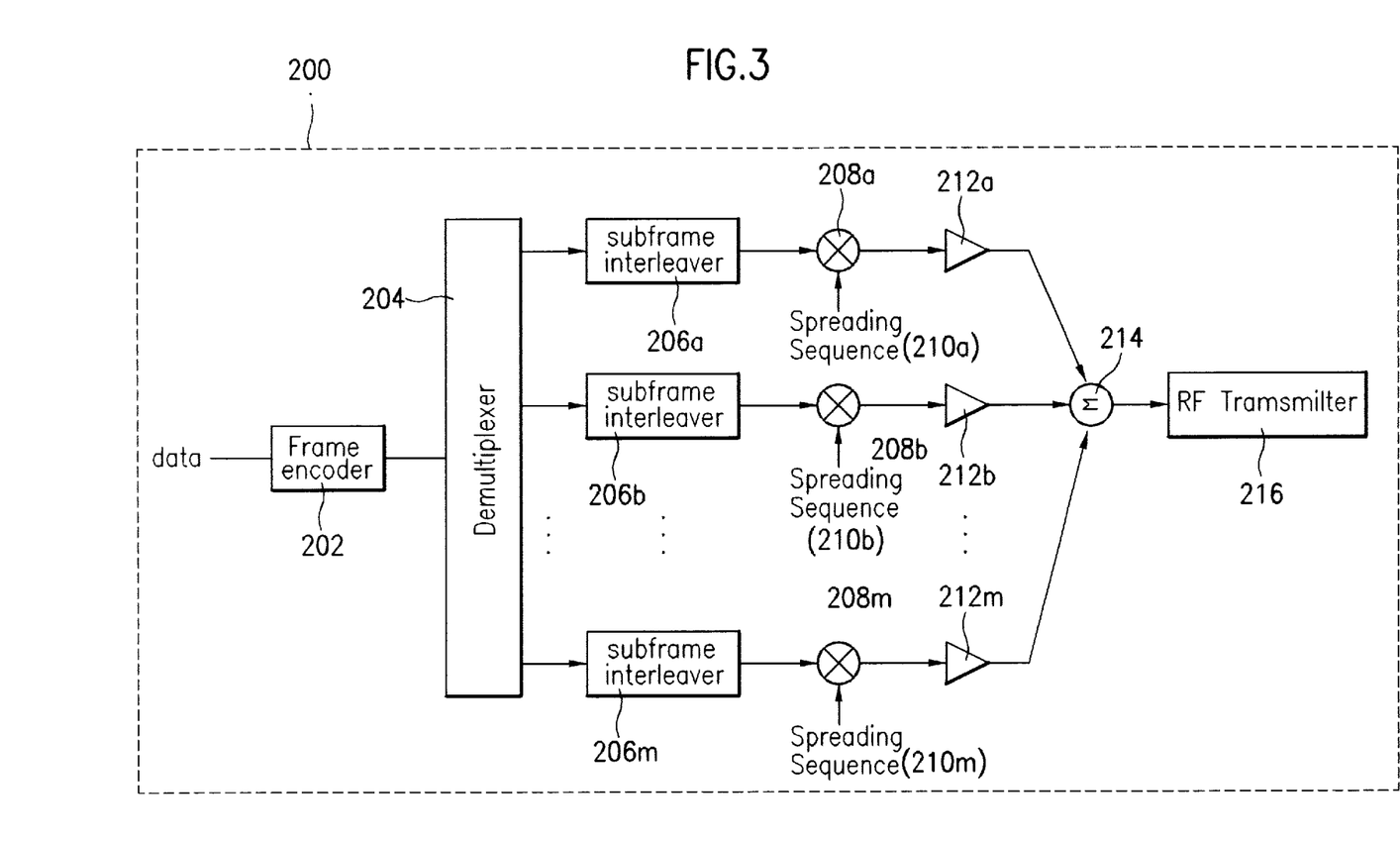
FIG. 3 is a block diagram illustrating configuration of a transmitting part of a base station in a CDMA cellular telephone system embodied according to the present invention.
Figure 4:
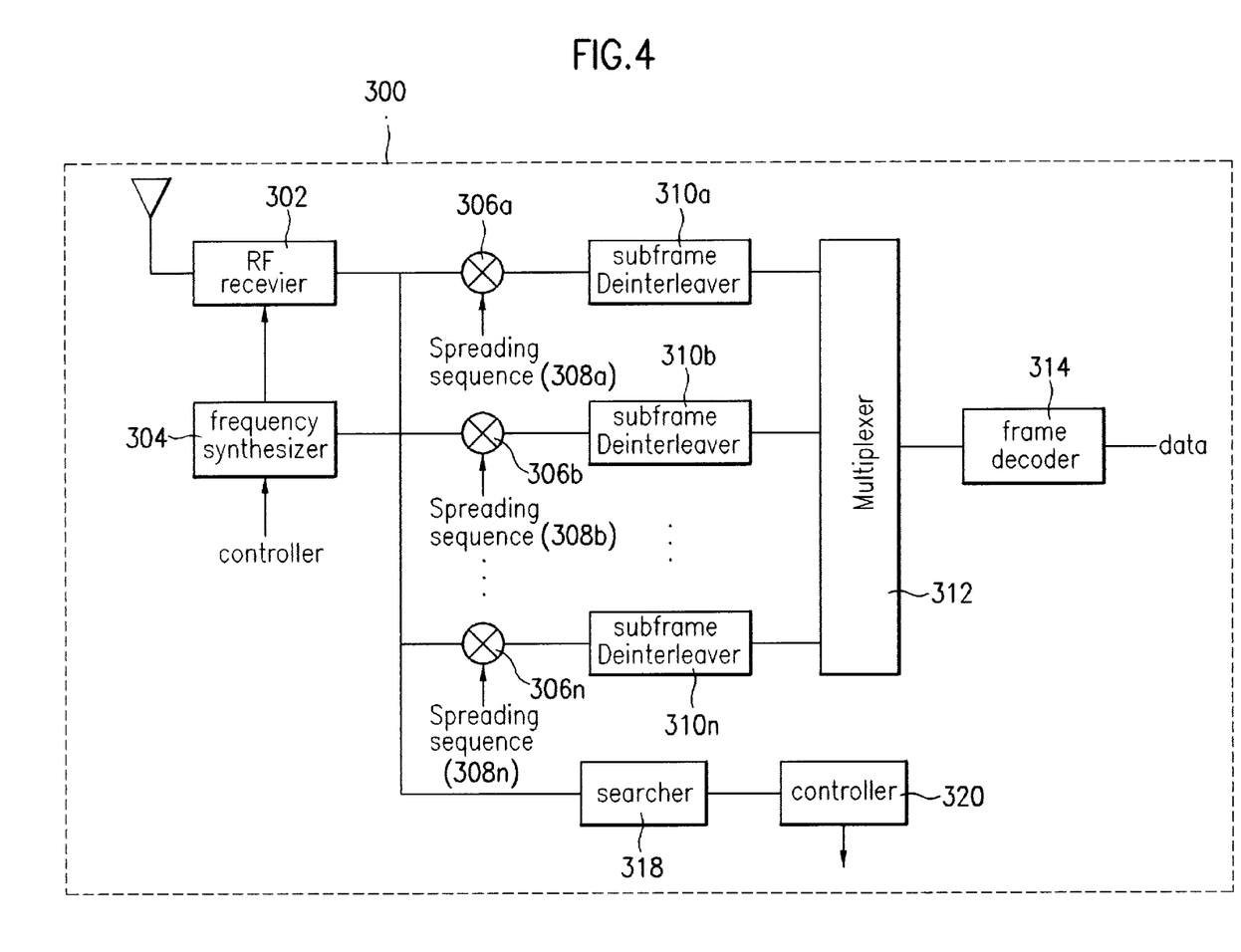
FIG. 4 is a block diagram illustrating configuration of a receiving part of a mobile terminal in a CDMA cellular telephone system embodied according to the present invention.

Referring to FIGS. 3 and 4, an inter-frequency handoff execution apparatus in the CDMA cellular telephone system is comprised of a receiving part 300 and a transmitting part 200, each of which is provided with the mobile terminal and the base station.

In construction, the transmitting part 200 includes a frame encoder 202 for changing data to be sent to a data frame, a demultiplexer 204 for dividing the data frame into a plurality of subframes, a plurality of subframe interleavers 206a to 206m for making patterns of the subframes different from each other, a plurality of spreaders 208a to 208m for modulating each of the plurality of subframes with different spreading sequences 210a to 210m, a plurality of gain adjusters 212a to 212m for adjusting gains of output signals from the plurality of subframes; an adder 214 for adding the subframes outputted from the gain adjusters 212a to 212m; and an RF transmitter 216 for transmitting the frame outputted from the adder 214.

The receiving part 300 includes an RF receiver 302 for receiving the frame transmitted from the transmitting part 200, a frequency synthesizer 304 for tuning the transmitted frequency to other frequency, a plurality of despreaders 306a to 306l for removing spreading sequences 308a to 308l of the subframes, a plurality of subframe deinterleavers for making patterns of the subframes different from each other, a multiplexer 312 for restoring the transmitted frame to an original frame, a frame decoder 314 for decoding the transmitted frame to an original data, a frequency synthesizer 304 for tuning a frequency of other base station, a searcher 318 for searching the frequency of the other base station, and a controller 320 for providing the searched frequency information to the frequency synthesizer 304.

In the transmitting part 200, the plurality of subframe interleavers 206a to 206m may be disposed on the front end of the demultiplexer 204 as an integrated body therewith or may be omitted. Further, the plurality of gain adjusters 212a to 212m may be placed on the front end of the demultiplexer 204 as an integrated body therewith.

In the receiving part 300, in the same manner as the above transmitting part 200, the plurality of subframe interleavers 310a to 310m may be disposed on the front end of the multiplexer 312 as an integrated body therewith or may be omitted.

Under the above construction, a detailed explanation of an inter-frequency handoff execution method at the mobile terminal side according to the present invention will be discussed.

To allow the mobile terminal to have a time period for searching a frequency of other base station at an inter-frequency handoff time point, after the base station sends/receives a control message to/from the mobile terminal, based upon a prescribed procedure, the data is transmitted only during the time $\alpha T_{frame}$ corresponding to the transmission frame and is not transmitted during the time $(1-\alpha) T_{frame}$ corresponding to the remaining transmission frames, wherein, $0 \leq \alpha \leq 1$ and $T_{frame}$ indicates the time corresponding to one transmission frame. As shown in FIG. 3, the transmitting part 200 divides one $T_{frame}$ frame into m $\alpha T_{frame}$ subframes.

$$m = \left| \frac{1}{\alpha} \right|$$

wherein, $|x|$ indicates the smallest integer greater or equal than/to x. For instance, $|1.1|=2$, and $|2.0|=2$. The m $\alpha T_{frame}$ subframes have different transmission patterns via the m subframe interleavers 206a to 206m. Meanwhile, the installation of the subframe interleavers may be omitted. Each of the subframes are spread through the m spreaders 208a to 208m to the different spreading sequences 210a to 210m, and the energy E per bit of the transmission frame by the m gain adjusters 208a to 208m is adjustable as follows:

$$E = \frac{E_\Delta X}{\alpha mn}$$

wherein, the $E_\Delta$ represents spare energy gain provided during the frequency search section of other base station, the "X" is an original energy per each bit, and the "n" indicates the number of repetition times in the original frame.

Of course, the gain adjusters 212a to 212m may be disposed on the front end of the demultiplexer 204 as integrated body therewith.

When the multiple subframes are constructed as discussed above, the two advantages can be obtained as follows: firstly, since the data to be recorded and transmitted in the frequency search section is divided and the divided data is transmitted, the same transmission rate as the frame in which no frequency search section exists can be maintained; and secondly, since the arrangement patterns of the same data are different in the multiple frame by means of the subframe interleavers, the time diversity effect which is capable of improving signal reception performance can be achieved.

Figure 5A:
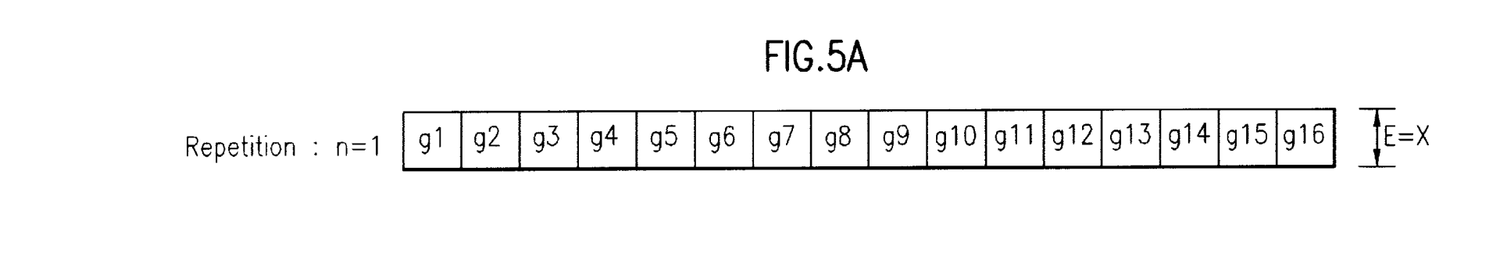
FIGS. 5A to 5C and FIGS. 6A to 6D are timing diagrams illustrating signal transmission in a forward link upon execution of inter-frequency handoff in the CDMA cellular telephone system embodied according to the present invention.

FIG. 5A is a timing diagram in which a proposed method is applied for the full rate of frame in the forward link. It is assumed that the frequency of the forward link on which current communication is formed is "f1", and the frequency of other forward link, which is searched by the mobile terminal so as to execute the handoff, is "f2".

Figure 5B:
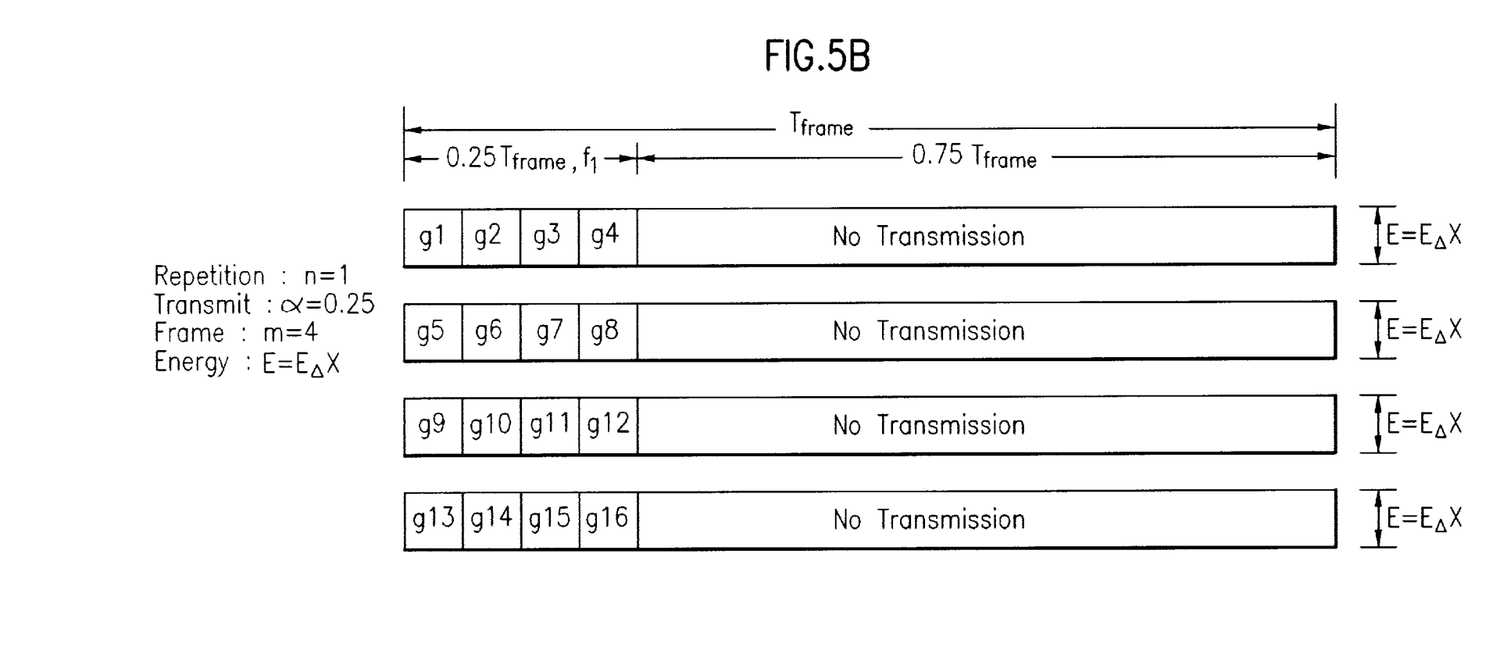

FIG. 5B is a timing diagram in which the frequency search section corresponding to the time 0.75 $T_{frame}$ is inserted. Hence, $$\left| \frac{1}{0.25} \right| = 4,$$

that is, 4 subframes are needed. At the time, the energy per bit $$E = \frac{E_\Delta X}{1 * 0.25 * 4} = E_\Delta X.$$

Figure 5C:
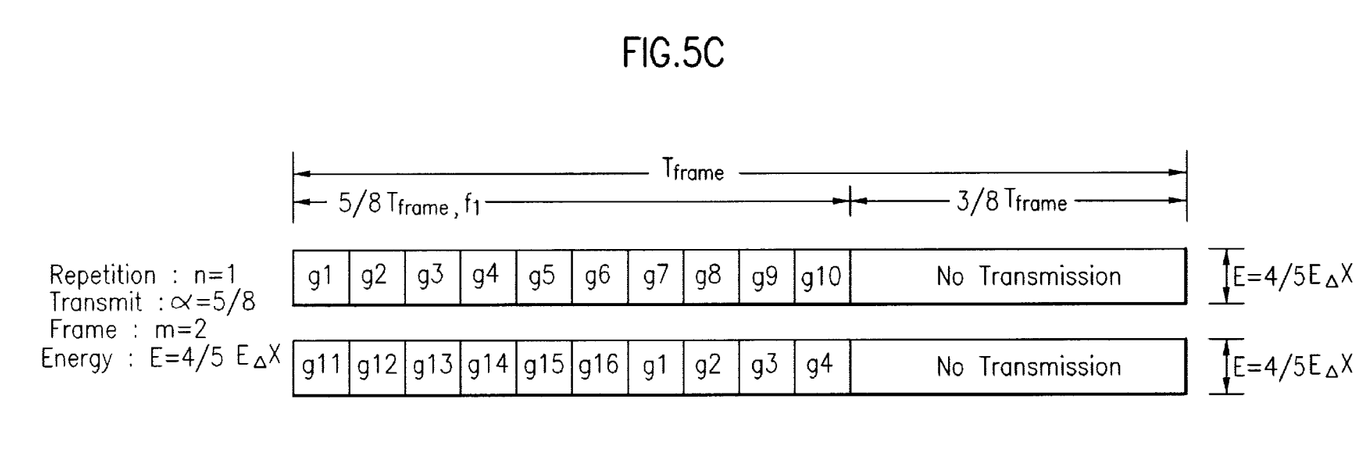

FIG. 5C is a timing diagram in which the frequency search section corresponding to the time ⅜ $T_{frame}$ is inserted. Hence, $$\left| \frac{1}{1 - 3/8} \right| = 2,$$

that is, 2 subframes are needed. At the time, the energy per bit $$E = \frac{E_\Delta X}{1 * 2 * 5/8} = \frac{4}{5} E_\Delta X.$$

Figure 6A:
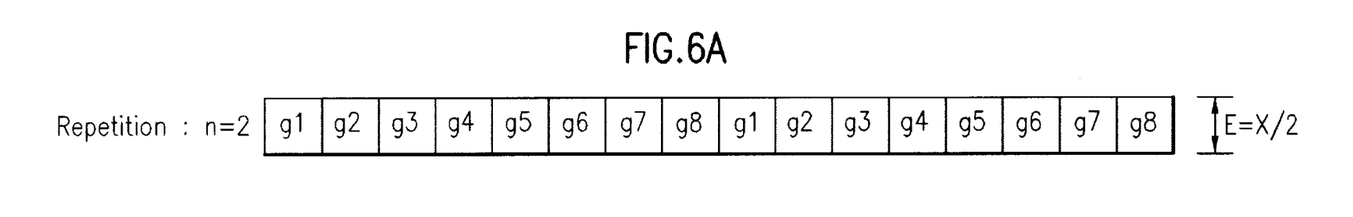

FIG. 6A is a timing diagram in which a proposed method is applied for the half rate of frame in the forward link.

Figure 6B:
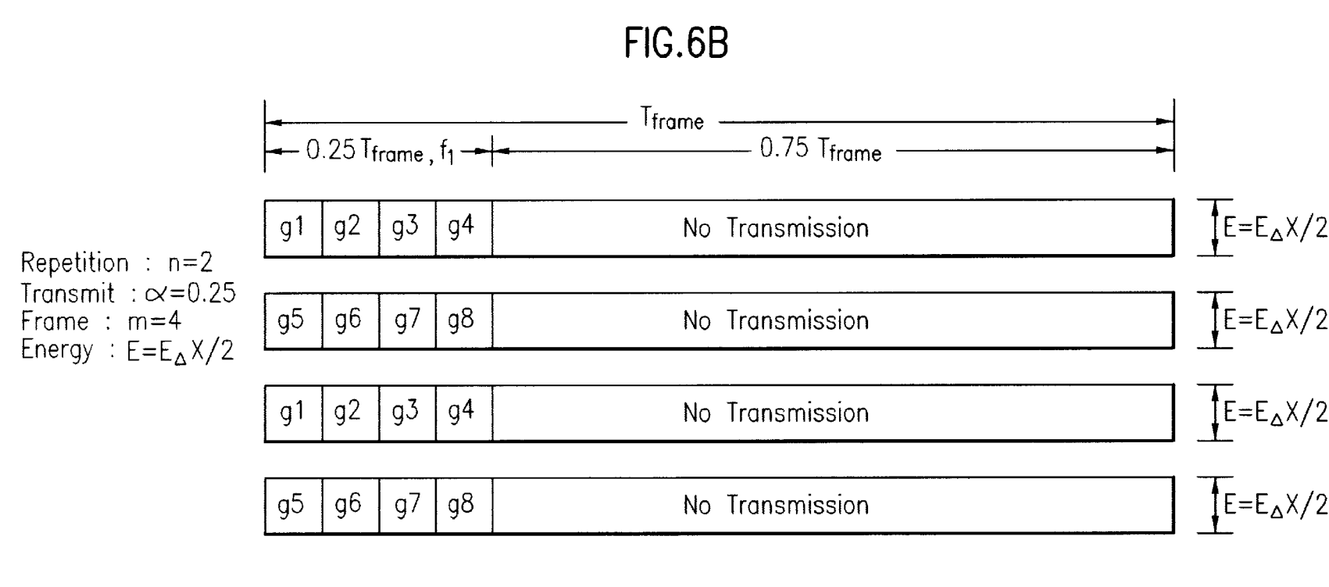
Figure 6C:
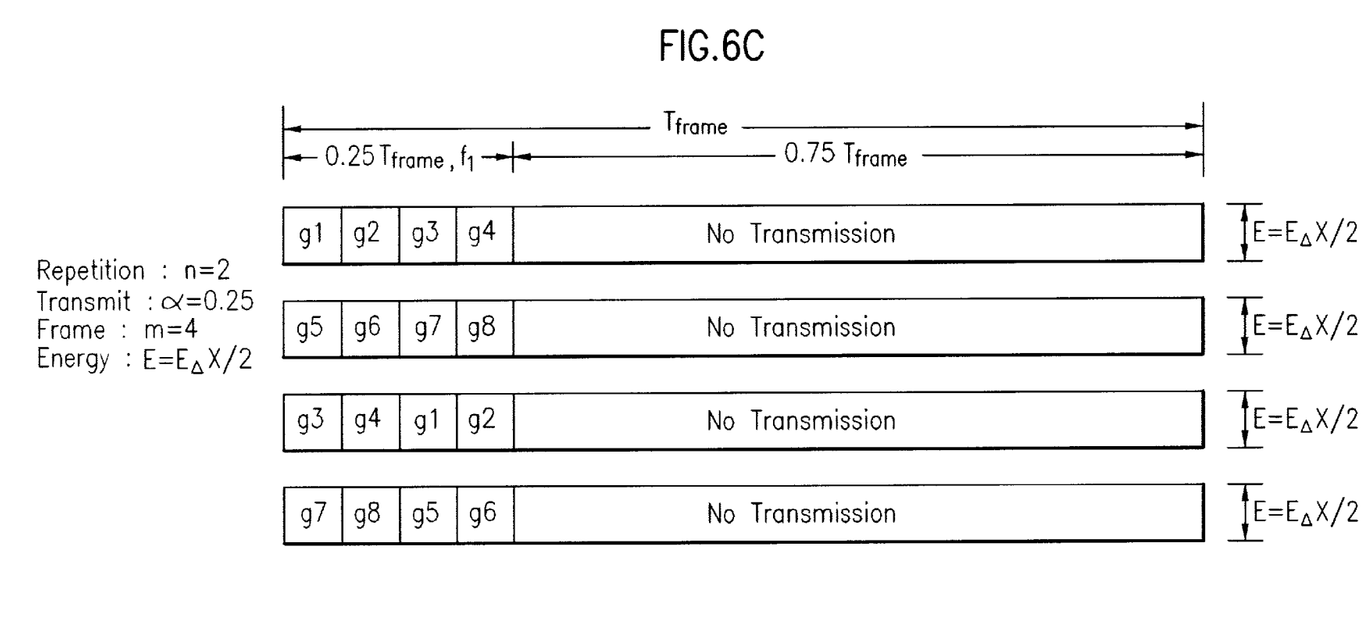

FIGS. 6B and 6C are timing diagrams in which the frequency search section corresponding to the time 0.75 $T_{frame}$ is inserted. Hence, $$\left| \frac{1}{0.25} \right| = 4,$$

that is, 4 subframes are needed. At the time, the energy per bit $$E = \frac{E_\Delta X}{2 * 0.25 * 4} = \frac{E_\Delta X}{2}.$$

In accordance with the construction of the subframe interleavers, the patterns of data group transmitted from the subframes can be different from each other, as shown in FIGS. 6B and 6C, thus to produce diversity gain.

Figure 6D:
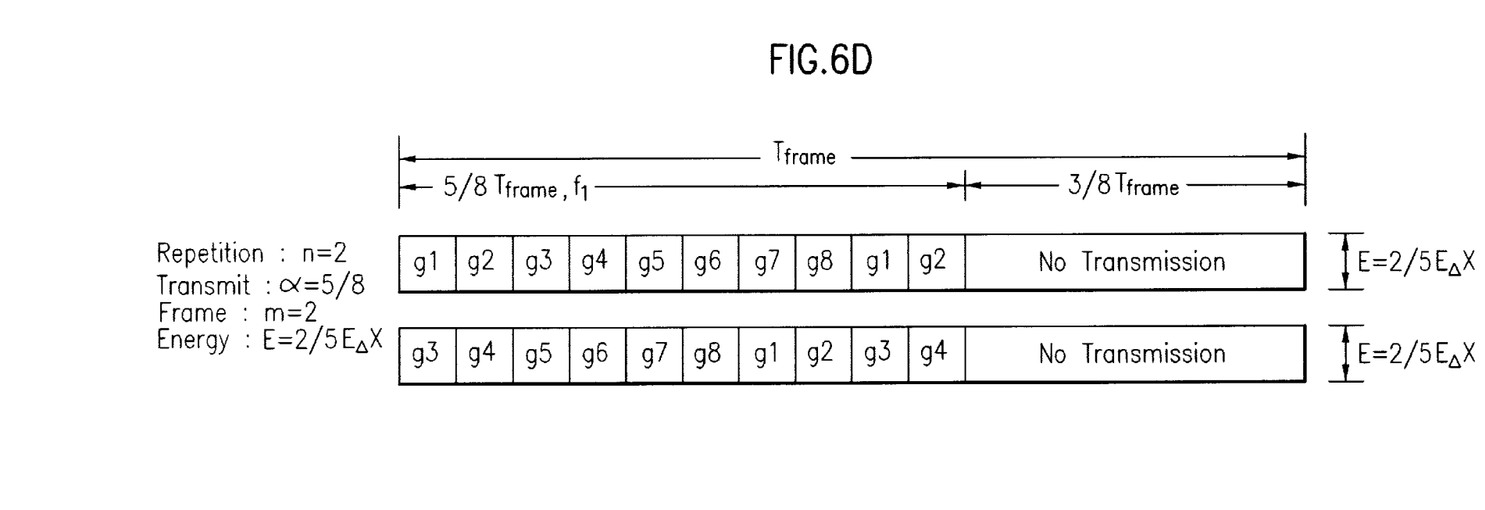

FIG. 6D is a timing diagram in which the frequency search section corresponding to the time ⅜ $T_{frame}$ is inserted. Hence, $$\left| \frac{1}{1 - 3/8} \right| = 2,$$

that is, 2 subframes are needed. At the time, the energy per $$E = \frac{E_\Delta X}{2 * 2 * 5/8} = \frac{2}{5} E_\Delta X.$$

If the modulated transmission frame is transmitted via the RF transmitter 216 in the transmitting part 200, the RF receiver 302 in the receiving part 300 receives the transmission frame.

At the inter-frequency handoff time point, after the mobile terminal sends/receives a control message to/from the base station currently connected thereto, based upon a prescribed procedure, it receives the frame in the forward link transmitted from the base station only during the time $\alpha T_{frame}$ via the 1 despreaders 306a to 306n and the 1 subframe deinterleavers 310a to 310n. Next, the mobile terminal constructs the received frame as one frame by means of the multiplexer 312 and receives the data through the frame decoder 314. And, during the time $(1-\alpha)T_{frame}$ the frequency f1 is tuned to the frequency f2 under the adjustment of the frequency synthesizer 304 and the signal of the base station which uses the frequency f2 is searched. If the time $(1-\alpha)T_{frame}$ elapses, the frequency f2 is tuned to the frequency f1 and the data is received in the same manner as the above. Accordingly, the mobile terminal searches, checks and initially synchronizes the frequency f2, while receiving the signal transmitted from the base station currently connected thereto. The number of the despreaders 306a to 308n and the number of the subframe deinterleavers 310a to 310n in the receiving part 300 are each equal or greater to/than the number of the spreaders 208a to 208n and the number of the subframe interleavers 206a to 206n (i.e., $1 \geq m$), and a RAKE receiver for each subframe may be constructed.

Figure 7A:
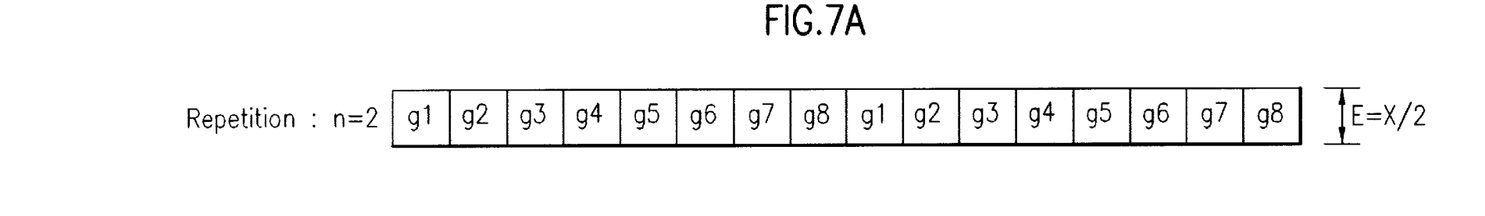
FIGS. 7A and 7B are timing diagrams illustrating signal transmission in a reverse link upon execution of inter-frequency handoff in the CDMA cellular telephone system embodied according to the present invention.

The above-mentioned method is applied to the forward link from the base station to the mobile terminal. On the other hand, to apply the above method to the reverse link from the mobile terminal to the base station, during the time $\alpha T_{frame}$ the frequency synthesizer in the mobile terminal performs a tuning operation to the frequency f3 of the base station currently communicated with the mobile terminal, and the mobile terminal transmits the subframes. During the time $(1-\alpha) T_{frame}$, the frequency synthesizer in the mobile terminal performs a tuning operation to the frequency f4 of the other base station with which the handoff is performed, and the mobile terminal transmits a reverse link pilot signal or a preamble signal, to thereby allow the base station having the reverse frequency band of the frequency f4 to execute a reverse synchronization. FIG. 7A is a timing diagram in which a proposed method is applied for the half rate of frame in the reverse link.

Figure 7B:
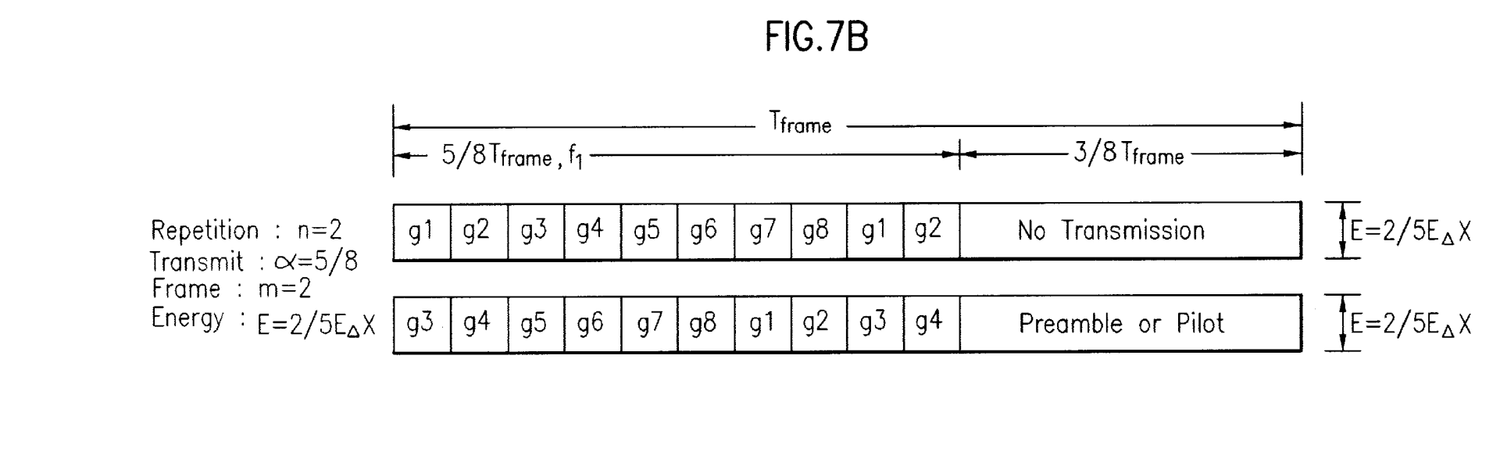

FIG. 7B is a timing diagram in which the reverse pilot signal or the preamble signal corresponding to the time $3/8$ $T_{frame}$ is inserted. Hence, $$\left| \frac{1}{1 - 3/8} \right| = 2,$$

that is, 2 subframes are needed. At the time, the energy per bit $$E = \frac{E_\Delta X}{2 * 2 * 5/8} = \frac{2}{5} E_\Delta X.$$

As apparent from the foregoing, an inter-frequency handoff execution method and apparatus in a mobile communication system can search, during the conversation between a mobile terminal having only a single RF receiver and a base station, the frequencies from other base station and the mobile terminal, without generation of call drop, to thereby achieve an inter-frequency handoff of the base station at a proper time.

In addition, an inter-frequency handoff execution method and apparatus in a mobile communication system can apply different PN offsets in a signal transmission section of the transmission frame used during the communication of a base station with a mobile terminal having a single RF receiver to thereby form a multiple frame, so that the data to be transmitted can be distributed and repeated, whereby it can obtain the same transmission speed as the frame in which only the data transmission section exists and a high transmission signal receiving performance.

It will be apparent to those skilled in the art that various modifications and variations can be made in an inter-frequency handoff execution method and apparatus in a mobile communication system of the present invention without departing from the spirit or scope of the invention. Thus, it is intended that the present invention cover the modifications and variations of this invention provided they come within the scope of the appended claims and their equivalents.

What is claimed is:

1. An inter-frequency handoff execution method in a mobile communication system, comprising:

forming a plurality of subframes from a data frame, each having a data transmission section for transmitting frame data and a frequency search section;

transmitting the plurality of subframes from a base station to an arbitrary mobile terminal;

executing data transmission of the frame data in the data transmission section;

searching a frequency of other base station in the frequency search section; and determining whether or not handoff is executed in accordance with the searched result, wherein frame data in each of the plurality of subframes is interleaved independently of the other subframes to achieve a different arrangement pattern in each of the plurality of subframes, and wherein a transmitting power of said plurality of subframes is adjusted in accordance with a repetition number and a number of subframes.

2. The method as defined in claim 1, wherein said frequency search section is inserted into an arbitrary position of said data frame under the agreement of said base station and said mobile terminal.

3. The method as defined in claim 2, wherein said handoff execution is determined by comparing frequency strength of said base station currently communicated with said mobile terminal with that of the frequency-searched other base station is executed and then in accordance with the compared result.

4. The method of claim 1, wherein the different arrangement pattern in each of the plurality of subframes provides for a time diversity of the data transmission.

5. The method of claim 1, further comprising adjusting an energy per bit for each of the subframes.

6. The method of claim 5, wherein the energy per bit is adjusted in accordance with a product of a spare energy provided during the search section multiplied by an original energy per bit, divided by a product of a number of subframes multiplied by a number of repetitions in the original frame.

7. The method as defined in claim 6, wherein determining whether a handoff can be executed comprises comparing frequency strength of a current base station currently with that of a frequency-searched base station.

8. An inter-frequency handoff execution method in a mobile communication system, comprising:

dividing a data frame which is transmitted from a base station to a mobile station into a plurality of subframes, each one of the plurality of subframes having an interleaved pattern that is different from the other subframes;

generating a frequency search period in each of said plurality subframes;

adjusting a transmission power of said plurality of subframes in accordance with a repetition number and a number of subframes;

spreading and transmitting each of said plurality of subframes using spreading sequences different from each other;

receiving said plurality of subframes and searching a frequency of other base stations during the frequency search period; and determining whether or not handoff is executed in accordance with the searched result.

9. The method as defined in claim 8, further comprising differentiating transmission patterns of said plurality of subframes from each other, after completion of said frequency search section inserting step.

10. The method as defined in claim 8, wherein searching the frequency of the other base station is comprises adjusting a frequency synthesizer in said base station to tune a current frequency to another frequency and executing state check and an initial synchronization of the another frequency.

11. The method as defined in claim 8, wherein said frequency search section is formed by the insertion of time $(1-\alpha) T_{frame}$ in the data frame having an arbitrary transmission rate (where, $0 \leq \alpha \leq 1$).

12. The method of claim 8, further comprising transmitting each of the plurality of subframes using a spreading sequence that is different than the spreading sequence used for the other subframes among the plurality of subframes.

13. An inter-frequency handoff execution method in a mobile communication system, comprising:

dividing a data frame which is transmitted from a base station to a mobile station into a plurality of subframes, each one of the plurality of subframes having an interleaved pattern that is different from the other subframes;

generating a frequency search period in each of said plurality subframes;

spreading and transmitting each of said plurality of subframes using spreading sequences different from each other;

adjusting a transmission power of said plurality of subframes in accordance with a repetition number;

receiving said plurality of subframes and searching a frequency of other base stations during the frequency search period; and determining whether or not handoff is executed in accordance with the searched result.

14. The method of claim 13, wherein the energy per bit is adjusted in accordance with a product of a spare energy provided during the search period multiplied by an original energy per bit, divided by a product of a number of subframes multiplied by a number of repetitions in the original frame.

15. An inter-frequency handoff execution method in a mobile communication system, comprising:

transmitting from an arbitrary mobile terminal to a corresponding base station a plurality of data subframes, each of the plurality of subframes having a data transmission section and a frequency search section;

executing data transmission in the data transmission section; and transmitting a reverse link pilot signal and a preamble signal in the frequency search section, wherein each of the plurality of subframes is subjected to interleaving and spreading independently of the other subframes.

16. The method as defined in claim 15, wherein said frequency search section is inserted into an arbitrary position of said data frame under the agreement of said base station and said mobile terminal.

17. The method of claim 15, where in each of the subframes has an interleaved pattern that is different from the other subframes.

18. The method of claim 15, where in an original data frame is converted to the plurality of subframes for transmission.

19. The method of claim 18, wherein the original data frame is demultiplexed into the plurality of subframes.

20. The method of claim 18, further comprising receiving the plurality of subframes and multiplexing them into the original data frame.

21. The method of claim 15, further comprising adjusting an energy per bit for each of the subframes.

22. The method of claim 21, wherein the energy per bit is adjusted in accordance with a product of a spare energy provided during the search period multiplied by an original energy per bit, divided by a product of a number of subframes multiplied by a number of repetitions in the original frame.

23. The method of claim 15, further comprising adjusting an energy per bit for each of the subframes in accordance with a repetition number and a number of subframes.

24. The method of claim 15, further comprising adjusting an energy per bit for each of the subframes, wherein the energy per bit is adjusted in accordance with a product of a spare energy provided during the search section multiplied by an original energy per bit, divided by a product of a number of subframes multiplied by a number of repetitions in the original frame.

25. The method of claim 15, further comprising transmitting each of the plurality of subframes using a spreading sequence that is different than the spreading sequence used for the other subframes among the plurality of subframes.

26. An inter-frequency handoff execution method in a mobile communication system, comprising:

dividing a data frame into a plurality of subframes and inserting a frequency search section into said data frame;

interleaving each of the plurality of subframes independently such that each subframe has a pattern that is different from the other subframes;

spreading said plurality of subframes to spreading sequences different from each other and transmitting the spread subframes;

transmitting the plurality of subframes from an arbitrary mobile terminal to a corresponding base station;

receiving said plurality of subframes to thereby restore one frame; and transmitting a reverse link pilot signal and a preamble signal in the frequency search section and determining whether or not handoff is executed.

27. The method as defined in claim 26, wherein transmitting said subframes is executed by the completion of tuning to a frequency of the base station currently communicated with the mobile terminal.

28. The method as defined in claim 26, wherein said frequency search section is formed by the insertion of time $(1-\alpha) T_{frame}$ in the data frame having an arbitrary transmission rate(where, $0 \leq \alpha \leq 1$).

29. The method of claimed 26, wherein interleaving each of the plurality of subframes independently achieves time diversity in transmission.

30. The method of claim 26, further comprising adjusting an energy per bit for each of the subframes.

31. The method of claim 30, wherein the energy per bit is adjusted in accordance with a product of a spare energy provided during the search period multiplied by an original energy per bit, divided by a product of a number of subframes multiplied by a number of repetitions in the original frame.

32. The method of claim 26, further comprising adjusting an energy per bit for each of the subframes in accordance with a repetition number and a number of subframes.

33. The method of claim 26, further comprising adjusting an energy per bit for each of the subframes, wherein the energy per bit is adjusted in accordance with a product of a spare energy provided during the search section multiplied by an original energy per bit, divided by a product of a number of subframes multiplied by a number of repetitions in the original frame.

34. The method of claim 26, further comprising transmitting each of the plurality of subframes using a spreading sequence that is different than the spreading sequence used for the other subframes among the plurality of subframes.

35. An inter-frequency handoff execution apparatus in a mobile communication system, comprising:
a frame encoder for changing data to be sent to a data frame;
a demultiplexer for dividing the data frame into a plurality of subframes;
a plurality of subframe interleavers for making patterns of said subframes outputted from said demultiplexer different from each other;
a plurality of spreaders for modulating each of said plurality of subframes to different spreading sequences;
a plurality of gain adjusters configured to adjust an energy per bit for each of the plurality of subframes, wherein the energy per bit is adjusted in accordance with a product of a spare energy provided during a search section of the subframe multiplied by an original energy per bit, divided by a product of a number of subframes multiplied by a number of repetitions in the original frame;
an adder for adding each of said plurality of subframes; and
an RF transmitter for transmitting the frame outputted from said adder.

36. The apparatus as defined in claim 35, wherein each of said subframe interleavers is disposed on a rear end of said demultiplexer or on a front end of said demultiplexer as an integrated body therewith.

37. The apparatus as defined in claim 35, further comprising a plurality of gain adjusters for adjusting gains of output signals from said plurality of spreaders, said gain adjusters being each disposed on the rear end of said plurality of spreaders or on the front end of said demultiplexer as an integrated body therewith.

38. The apparatus of claim 35, further comprising transmitting each of the plurality of subframes using a spreading sequence that is different than the spreading sequence used for the other subframes among the plurality of subframes.

39. An inter-frequency handoff execution apparatus in a mobile communication system, comprising:
an RF receiver for receiving a frame transmitted from a transmitter;
a plurality of despreaders for removing spreading sequences of a plurality of subframes of the frame outputted from said RF receiver, each of the subframes having a different spreading sequence;
a plurality of subframe deinterleavers for making patterns of said subframes different from each other;
a multiplexer for restoring said plurality of subframes transmitted from said plurality of despreaders to an original frame;
a frame decoder for decoding the frame outputted from said multiplexer to original data;
a frequency synthesizer for tuning a frequency of other base station;
a searcher for searching the frequency of the other base station; and
a controller for providing the searched frequency information of the other base station to said frequency synthesizer, wherein the transmitter comprises a plurality of gain adjusters configured to adjust an energy per bit for each of the plurality of subframes, wherein the energy per bit is adjusted in accordance with a product of a spare energy provided during a search section of the subframe multiplied by an optical energy per bit, divided by a product of a number of subframes multiplied by a number of repetitions in the original frame.

40. The apparatus as defined in claim 39, wherein each of said subframe deinterleavers is disposed on a rear end of said despreaders or on a rear end of said demultiplexer as an integrated body therewith.

41. The method of claim 39, wherein the spreading sequences of each of the plurality of subframes of the frame outputted from said RF receiver are spread using a spreading sequence that is different than the spreading sequence used for the other subframes among the plurality of subframes.

42. A method of performing an inter-frequency handoff in a mobile communication system, comprising:
dividing a data frame into a plurality of sub-frames, each sub-frame having a data component and a searching period;
separately interleaving and spreading each sub-frame for transmission;
transmitting each of the plurality of sub-frames and adjusting a transmitting power of said plurality of subframes in accordance with a repetition number and a number of subframes;
searching for a frequency of a target base station during the searching period of each sub-frame; and
determining whether a handoff can be executed in accordance with a result of the search for a frequency.

43. The method of claim 42, wherein determining whether the handoff can be executed comprises comparing a frequency strength of a current base station with a frequency strength of a frequency-searched base station.

44. The method of claim 42, further comprising adjusting an energy per bit for each of the subframes.

45. The method of claim 42, further comprising transmitting each of the plurality of subframes using a spreading sequence that is different than the spreading sequence used for the other subframes among the plurality of subframes.

46. A method of performing an inter-frequency handoff in a mobile communication system, comprising:
dividing a data frame into a plurality of sub-frames, each sub-frame having a data component and a searching period;
separately interleaving and spreading each sub-frame for transmission;
adjusting an energy per bit for each of the subframes, wherein the energy per bit is adjusted in accordance with a product of a spare energy provided during the searching period multiplied by an original energy per bit, divided by a product of a number of subframes multiplied by a number of repetitions in the original frame;

transmitting each of the plurality of sub-frames;

searching for a frequency of a target base station during the searching period of each sub-frame;

determining whether a handoff can be executed in accordance with a result of the search for a frequency.

47. An inter-frequency handoff execution method in a mobile communication system, comprising:

dividing a frame of data which is transmitted from a base station to a mobile station into a plurality of subframes applied by a time diversity respectively;

generating a frequency search period into each of said plurality of subframes;

spreading and transmitting each of said plurality of subframes using spreading sequences different from the spreading sequence uses for the other subframes among the plurality of subframes and adjusting a tansmitting power of said plurality of subframes in accordance with a repetition number, a period of information in the subframe, and a number of subframes;

receiving the spread subframes and searching a frequency of other base station in the frequency search period;

determining whether or not a handoff can be executed in accordance with the searched result.

48. An inter-frequency handoff execution apparatus in a mobile communication system, comprising:

a frame encoder for changing data to be sent to a data frame;

a demultiplexer for dividing the data frame into a plurality of subframes;

a plurality of subframe interleavers for making patterns of said subframes outputted from said demultiplexer different from each other;

a plurality of spreaders for modulating each of said plurality of subframes to different spreading sequences;

a plurality of gain adjusters configured to adjust an energy per bit for each of the plurality of subframes, wherein the energy per bit is adjusted in accordance with a repetition number and a number of subframes;

an adder for adding each of said plurality of subframes; and an RF transmitter for transmitting the frame outputted from said adder.

49. An inter-frequency handoff execution apparatus in a mobile communication system, comprising:

an RF receiver for receiving a frame transmitted from a transmitter;

a plurality of despreaders for removing spreading sequences of a plurality of subframes of the frame outputted from said RF receiver, each of the subframes having a different spreading sequence;

a plurality of subframe deinterleavers for making patterns of said subframes different from each other;

a multiplexer for restoring said plurality of subframes transmitted from said plurality of despreaders to an original frame;

a frame decoder for decoding the frame outputted from said multiplexer to original data;

a frequency synthesizer for tuning a frequency of other base station;

a searcher for searching the frequency of the other base station; and a controller for providing the searched frequency information of the other base station to said frequency synthesizer, wherein the transmitter comprises a plurality of gain adjusters configured to adjust an energy per bit for each of the plurality of subframes, wherein the energy per bit is adjusted in accordance with a repetition number and a number of subframes.

50. A method of performing inter frequency handoff in a mobile communication system, comprising:

dividing a data frame having a repetition symbol which is transmitted from a base station to a mobile station into a plurality of sub-frames;

generating a frequency searching period into the data frame by spreading the plurality of sub-frames with a sequence set having different spreading sequences respectively;

adjusting an energy per bit for the plurality of sub-frames in accordance with one of a repetition number and a number of subframes;

transmitting the data frame with the frequency searching period on a channel;

receiving and searching a frequency of other base station in the frequency search period; and determining whether or not handoff is executed in accordance with the searched result.

51. The method of claim 50, further comprising transmitting each of the plurality of subframes using a spreading sequence that is different than the spreading sequence used for the other subframes among the plurality of subframes.

52. A method of performing inter frequency handoff in a mobile communication system, comprising:

dividing a data frame having a repetition symbol which is transmitted from a base station to a mobile station into a plurality of sub-frames;

generating a frequency searching period into the data frame by spreading the plurality of sub-frames with a sequence set having different spreading sequences respectively;

adjusting an energy per bit for the plurality of sub-frames, wherein the energy per bit is adjusted in accordance with a product of a spare energy provided during the search section multiplied by an original energy per bit, divided by a product of a number of subframes multiplied by a number of repetitions in the original frame;

transmitting the data frame with the frequency searching period on a channel;

receiving and searching a frequency of other base station in the frequency search period; and determining whether or not handoff is executed in accordance with the searched result.

* * * * *